United States Patent
Cullum et al.

(10) Patent No.: US 10,529,146 B2
(45) Date of Patent: *Jan. 7, 2020

(54) POSITIONING OBJECTS IN THREE-DIMENSIONAL GRAPHICAL SPACE

(71) Applicant: MICROSOFT TECHNOLOGY LICENSING, LLC, Redmond, WA (US)

(72) Inventors: Alexander Charles Cullum, Maidenhead (GB); Barry John Ptak, Letchworth Garden City (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,150

(22) Filed: Jun. 19, 2018

(65) Prior Publication Data

US 2018/0300960 A1 Oct. 18, 2018

Related U.S. Application Data

(63) Continuation of application No. 15/428,829, filed on Feb. 9, 2017, now Pat. No. 10,019,851.

(60) Provisional application No. 62/412,812, filed on Oct. 25, 2016.

(51) Int. Cl.
*G06T 19/20* (2011.01)
*G06F 3/0481* (2013.01)
*G06T 15/60* (2006.01)

(52) U.S. Cl.
CPC .......... *G06T 19/20* (2013.01); *G06F 3/04815* (2013.01); *G06T 15/60* (2013.01); *G06T 2200/24* (2013.01)

(58) Field of Classification Search
None
See application file for complete search history.

(56) References Cited

U.S. PATENT DOCUMENTS

| 2003/0128242 | A1* | 7/2003 | Gordon | G06F 3/04815 715/848 |
| 2007/0097115 | A1* | 5/2007 | Ok | G06F 3/04815 345/419 |
| 2012/0050270 | A1* | 3/2012 | Noda | G06F 3/017 345/419 |
| 2012/0056900 | A1* | 3/2012 | Park | G06F 3/04815 345/653 |

(Continued)

OTHER PUBLICATIONS

Au, Oscar Kin-Chung, Chiew-Lan Tai, and Hongbo Fu. "Multitouch gestures for constrained transformation of 3d objects." Computer Graphics Forum. vol. 31. No. 2pt3. Oxford, UK: Blackwell Publishing Ltd, 2012.*

(Continued)

*Primary Examiner* — Ryan M Gray
(74) *Attorney, Agent, or Firm* — Shook, Hardy & Bacon, LLP

(57) ABSTRACT

Aspects of the technology described herein provide a control interface for manipulating a 3-D graphical object within a virtual drawing space. The control can automatically group objects together for common manipulation. The control can take the form of a scaled representation of a group of objects located outside of the primary drawing space. Moving the representation then moves the objects.

20 Claims, 6 Drawing Sheets

(56) References Cited

U.S. PATENT DOCUMENTS

2012/0180000 A1* 7/2012 Weng .................. G06F 3/04815
715/848

OTHER PUBLICATIONS

Wu, Siju, et al. "TouchSketch: a touch-based interface for 3D object manipulation and editing." Proceedings of the 21st ACM Symposium on Virtual Reality Software and Technology. ACM, 2015.*

* cited by examiner

POSITIONING OBJECTS IN THREE-DIMENSIONAL GRAPHICAL SPACE

CROSS-REFERENCE TO RELATED APPLICATIONS

This application is a continuation of U.S. patent application Ser. No. 15/428,829, filed Feb. 9, 2016, entitled "POSITIONING OBJECTS IN THREE-DIMENSIONAL GRAPHICAL SPACE," which application claims the benefit of priority of U.S. Provisional Application No. 62/412,812, filed Oct. 25, 2016, entitled "POSITIONING OBJECTS IN THREE-DIMENSIONAL GRAPHICAL SPACE," the entirety of which is herein incorporated by reference.

BACKGROUND

When adjusting the position of a three-dimensional object in three-dimensional graphic space, a user may wish to move a group of related objects together.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein can provide a control interface for adjusting the z-depth of an object or group of objects within virtual 3-D space. The control interface may be described herein as a z-layer view or z-layer control. The z-layer view can be generated by adjusting the camera location to be substantially perpendicular to the z-axis and/or a y-z plane. The camera may be located above or below a z-axis that defines the world space. This view gives the viewer a perspective of an object's location along the z-axis.

The z-layer view also comprises an object control interface. The object control interface comprises scaled representations of individual objects or scaled representations of groups of objects. The object control interface can be located below the graphical objects and off to a side. In one aspect, the control interface is located to a side closest the camera generating the scene. A user may move the actual objects by moving the scaled representations along the z-axis.

Aspects of the technology described herein can automatically group objects within a three-dimensional drawing space together for the purpose of group manipulation. The grouping is only for the purpose of manipulation and the association between the objects does not need to be persistent. In one aspect, a first object is selected by the user as an initial group member. For example, the user can double-click on an object to initiate the selection. In one aspect, the first click opens a control interface and the second click, received while the control interface is open, initiates the grouping process. Once initiated, the grouping process walks all objects that touch the initial object or satisfy a closeness criterion in a recursive fashion until all objects either touching or meeting the closeness criterion are grouped together. The control may expand from covering the first selected object to all of the selected objects. Individual objects within the group may be individually deselected by the user clicking on the object.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein can provide a control interface for adjusting the z-depth of an object or groups of objects within 3-D space. The control interface may be described herein as a z-layer view or z-layer control. The z-layer view can be generated by adjusting the camera location to be substantially perpendicular to the z-axis and/or a y-z plane. The camera may be located above or below a z-axis that defines the world space. This view gives the viewer a perspective of an object's location along the z-axis.

The z-layer view also comprises an object control interface (alternatively described as object control). The object control interface comprises scaled representations of individual objects or scaled representations of groups of objects. The object control interface can be located below the graphical objects and off to a side. In one aspect, the control interface is located to a side closest the camera generating the scene. A user may move the actual objects by moving the scaled representations along the z-axis.

Aspects of the technology described herein can automatically group objects within a three-dimensional drawing space together for the purpose of group manipulation. The grouping is only for the purpose of manipulation and the association between the objects does not need to be persistent. In one aspect, a first object is selected by the user as an initial group member. For example, the user can double-click on the object to initiate the selection. In one aspect, the first click opens a control interface and the second click, received while the control interface is open, initiates the grouping process. Once initiated, the grouping process walks all objects that touch or satisfy a closeness criterion in a recursive fashion until all objects meeting the closeness criterion are grouped together. The control may expand from covering the first selected object to all of the selected objects. Individual objects within the group may be individually deselected by the user clicking on the object.

Figure 1:
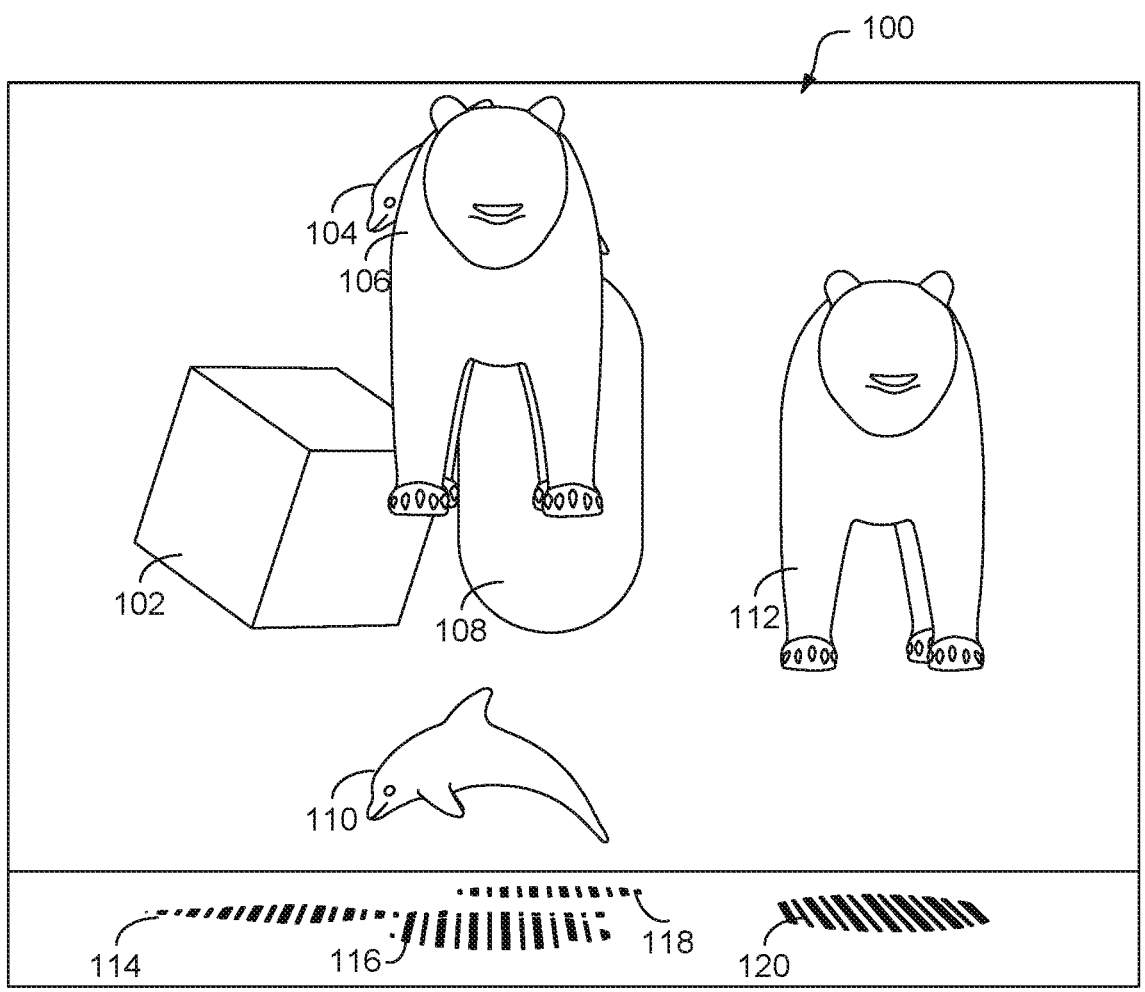
FIG. 1 shows a view of a 3-D graphical space, in accordance with aspects of the present disclosure.

Turning now to FIG. 1, a 3-D space 100 comprising a plurality of objects is shown, in accordance with an aspect of the technology described herein. The objects include a cube 102, a first dolphin 104, a first bear 106, a pill 108, a second dolphin 110, and a second bear 112. The view shown in FIG. 1, comprises shadows projected from above the objects onto an x-z plane located beneath the objects. The shadows help the users understand the location of the objects along the z-axis. The shadows include a first shadow 114, a second shadow 116, a third shadow 118, and a fourth shadow 120. The shadows are depicted as if cast by a light directly above a corresponding object. The first shadow 114 is directly under the cube 102. The second shadow 116 is directly under the first dolphin 104 and first bear 106. The third shadow 118 is under the pill 108. The fourth shadow 120 is directly under the second bear 112.

Figure 2:
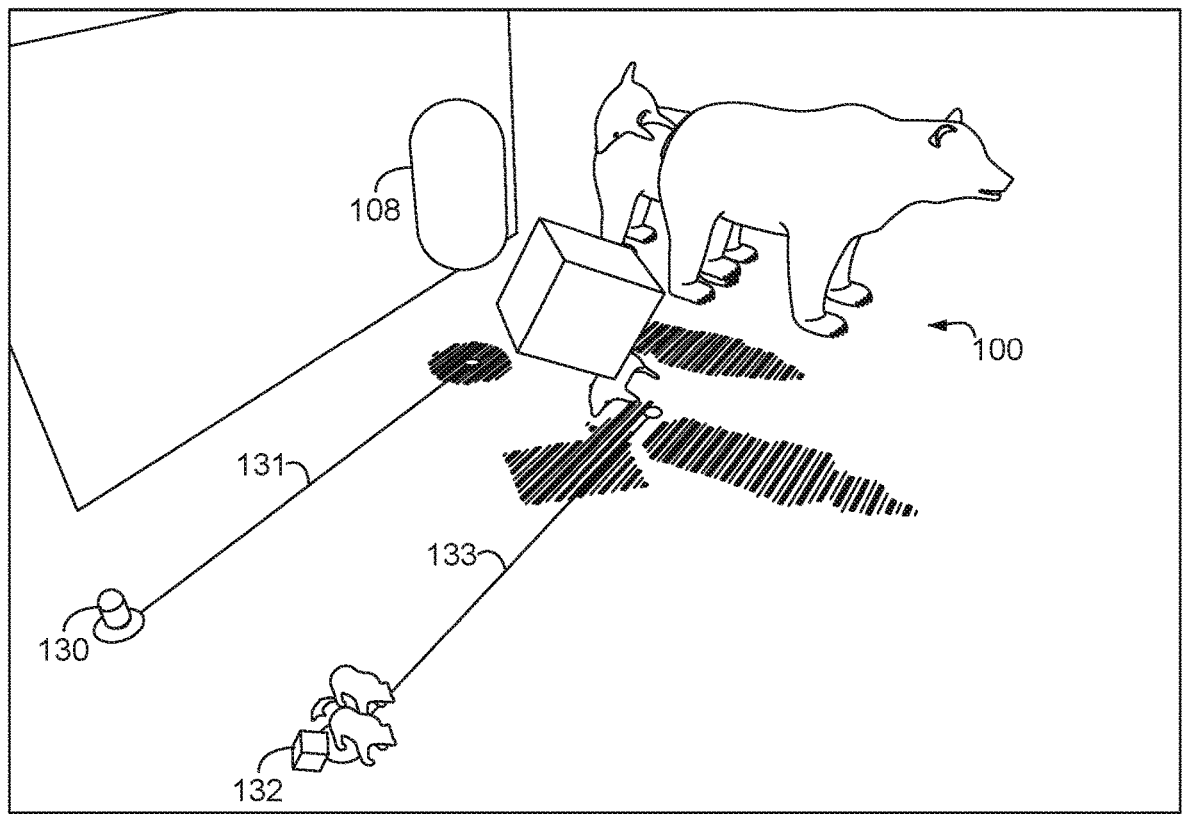
FIG. 2 shows a view of the z-depth control view, in accordance with aspects of the present disclosure.

Turning now to FIG. 2, a z-layer view 200 of the objects is provided. The z-layer view 200 shows the same 3-D space 100 and objects depicted in FIG. 1. The z-layer view 200 may be provided in response to a user command. The z-layer view 200 can be generated by moving the camera location substantially perpendicular to a z-axis and/or a y-z plane running through an object or group of objects. In one aspect, the camera is located at a point along the z-axis perpendicular to and facing the object with the largest z-value. In another aspect, the camera is located at a z-value that is a midpoint between objects. The camera may be located above or below a z-axis that defines the world space and above or below some or all objects in the space. This view gives the user a perspective of an object's location along the z-axis.

The z-layer view also comprises an object control interface 130 and 132. The object control interface comprises a scaled representation of an individual object or a scaled representations of a group of objects. The group object control interface 132 comprises a scaled representation of each object in the group of objects comprising to the cube 102, the first dolphin 104, the first bear 106, the second dolphin 110, and the second bear 112. The pill object control 130 controls the pill 108. Moving the group object control 132 forward or backwards along the z-axis will move all of the corresponding objects within the group by the same amount along the z-axis. In other words, both bears (106 and 112), both dolphins (104 and 110) and the cube 102 will move when the group object control 132 moves. The pill control 130 works in a similar fashion. As can be seen, a line can extend from the object control interface to the shadows of the actual objects projected onto an x-z plane beneath the objects. All of the object control interface 130 and 132 can be located on the same x-z plane.

In addition to moving the objects through the object control interface 130 and 132, groups of objects or individual objects may be moved directly. For example, clicking and dragging a single object in the group will move the entire group of objects. To move an individual object associated with a group, the object first needs to be disassociated with the group, for example, by double-clicking the object. Other methods of disassociating an object from a group are possible double-clicking is just one example. Similarly, objects not currently associated with the group may be automatically associated with a group or manually associated with a group while in the z-layer view. For example, an object may be added to a group when the object is moved within a threshold distance of an existing group. Similarly, a group can be formed when two objects are moved next to each other.

The user is able to activate a group selection function in any number of ways. In one aspect, a group selection function button, such as a menu icon, is pushed. The next object selected can then be the initial object from which the group is built. In order to identify group members, a recursive process can evaluate objects in the 3-D space according to a set of criteria. The criteria can group objects that touch or are within a threshold distance. The threshold distance can be absolute or relative to an object's size. An absolute threshold could be measured along the closest distance between the exterior of two objects. Any suitable unit of measure within the 3-D space could be used, for example pixels. The relative threshold is based on one or both objects being considered. For example, the threshold distance could be a percentage of an object's width, height, or length. In one aspect, the threshold is a percentage of the average distance of the width, height, and length.

The recursive process works by evaluating each object near the initial object. Objects are either added or rejected from the group. As an object is added, the process repeats using the newly added object as the base object for making the determination.

In one aspect, the three-dimensional objects in a drawing space are projected against a plane that is normal to the current camera angle on the scene. For example, if the camera was looking straight down the z-axis, then the objects could be projected onto the x-y plane for analysis. Projecting the objects onto a plane eliminates one dimension from the analysis. In the example above, the projected objects could be in contact with each other even though they are at different depths along the z-axis and not actually in contact or even close.

The group selections described above can work with various methods of individual selection. For example, given the user is in the object selection mode, and the user drags a box in the work area, any objects inside that area will become selected together (regardless of their depth in the scene). In one aspect, when the user is in the object selection mode and shift-clicks an object, that object will be added to the current selection. If zero objects are selected, shift-clicking will select the first object as normal.

When the user is in the object selection mode with 1+ objects selected, and the user drags a box in the work area, any objects inside that box area will have their selection state reversed. In other words, if an object in the group is moved individually, then it is dissociated with the group until the user associates it again.

When group selection is active, selected objects will be deselected and unselected objects will be added to the group. Given there are a number of objects selected, the control interface will surround all the selected objects and all selected objects may also have a visible glow around them.

When there are a number of objects selected with a surrounding control interface and glow, any unselected objects in the same volume will not have the colored glow around them.

When there are a number of objects selected, and the user clicks the Group button, the objects can be associated together. When the user is in the object selection mode and the user clicks on an object in a group, all other objects in the group can also be selected. When the user is in the object selection mode and the user has an object or objects selected, if the user shift-clicks a group of objects, that group will be added to the current selection. When the user is using the mouse or pen and is in object selection mode, and the user hovers over any object, the user will see a light glow to indicate they could select that object. The light glow acts as a hint. For groups, all objects in the group may glow. If the objects are physically overlapping only an 'outline' glow around their outer limit will be shown, in one aspect.

In some instances, a group of objects can comprise several subgroups. For example, auto grouping could identify several groups of objects and then the user could associate the groups with each other. There can be a hierarchy among groups based on size, group orientation, or other factors. When the user has an active selection of more than one object, and the user double-clicks/taps on an object in the selection, the object (or group) tapped will temporarily become selected instead ("isolation mode"). Further double taps will drill down through any group hierarchy until a single object is selected.

Figure 3:
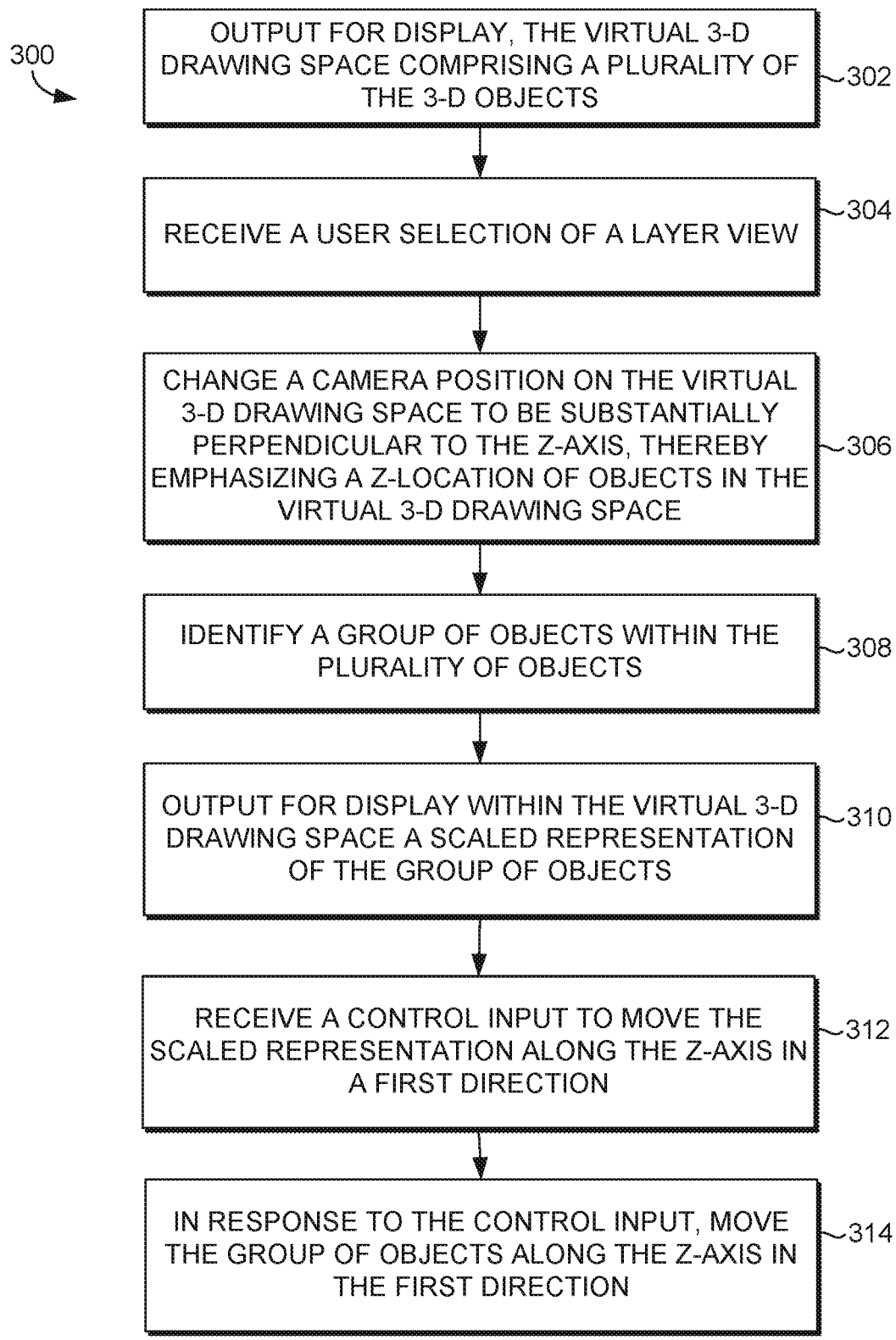
FIG. 3 shows a flow diagram for a method of moving objects in 3-D drawing space, in accordance with aspects of the present disclosure.

Turning now to FIG. 3, a flow diagram of a method 300 for manipulation a 3-D graphical object is shown, in accordance with aspects of the present disclosure. Method 300 could be performed by a computing device, such as computing device 400. The computing device can take the form of a laptop computer, a personal computer with detached display, a tablet computer, a smartphone, a holographic display, a virtual reality headset, an augmented reality headset, or some combination of the above or similar devices.

At step 302, the virtual 3-D drawing space comprising a plurality of the 3-D objects is output for display. The virtual 3-D drawing space can be displayed in 3-D, using stereoscopic technology, or other techniques that provide a three-dimensional appearance to the display. The virtual 3-D drawing space can also be displayed in 2-D with various camera angles used to depict the 3-D space.

At step 304, the user activates a z-layers view. For example, the user can select a Z-layer interface control button to activate the view.

At step 306, the view is created, in part, by changing a camera position on the virtual 3-D drawing space to be substantially perpendicular to the z-axis, thereby emphasizing a z-location of objects in the virtual 3-D drawing space. In an aspect, the camera position is moved to one side of the objects to be manipulated to emphasize the z-depth.

At step 308, a group of objects within the plurality of objects is identified. Objects can be identified automatically or selected by a user as described above. The group could have been formed outside of the z-layers view.

At step 310, an object control is output for display within the virtual 3-D drawing space. The object control can comprise a scaled representation of an object or objects associated with the control. The scale can be greater than 2:1, meaning the scaled representation is no more than half the size of the actual objects being represented. The scale can be much greater meaning the objects could be 10 times or more the size of the scaled representation. The object control can be located near a side of the interface where the camera is located.

At step 312, a control input is received to move the object control interface along the z-axis in a first direction. The control input can be selecting and dragging the object control.

At step 314, in response to the control input, the group of objects is moved along the z-axis in the first direction. The group of objects can be moved the same distance as object control.

Figure 4:
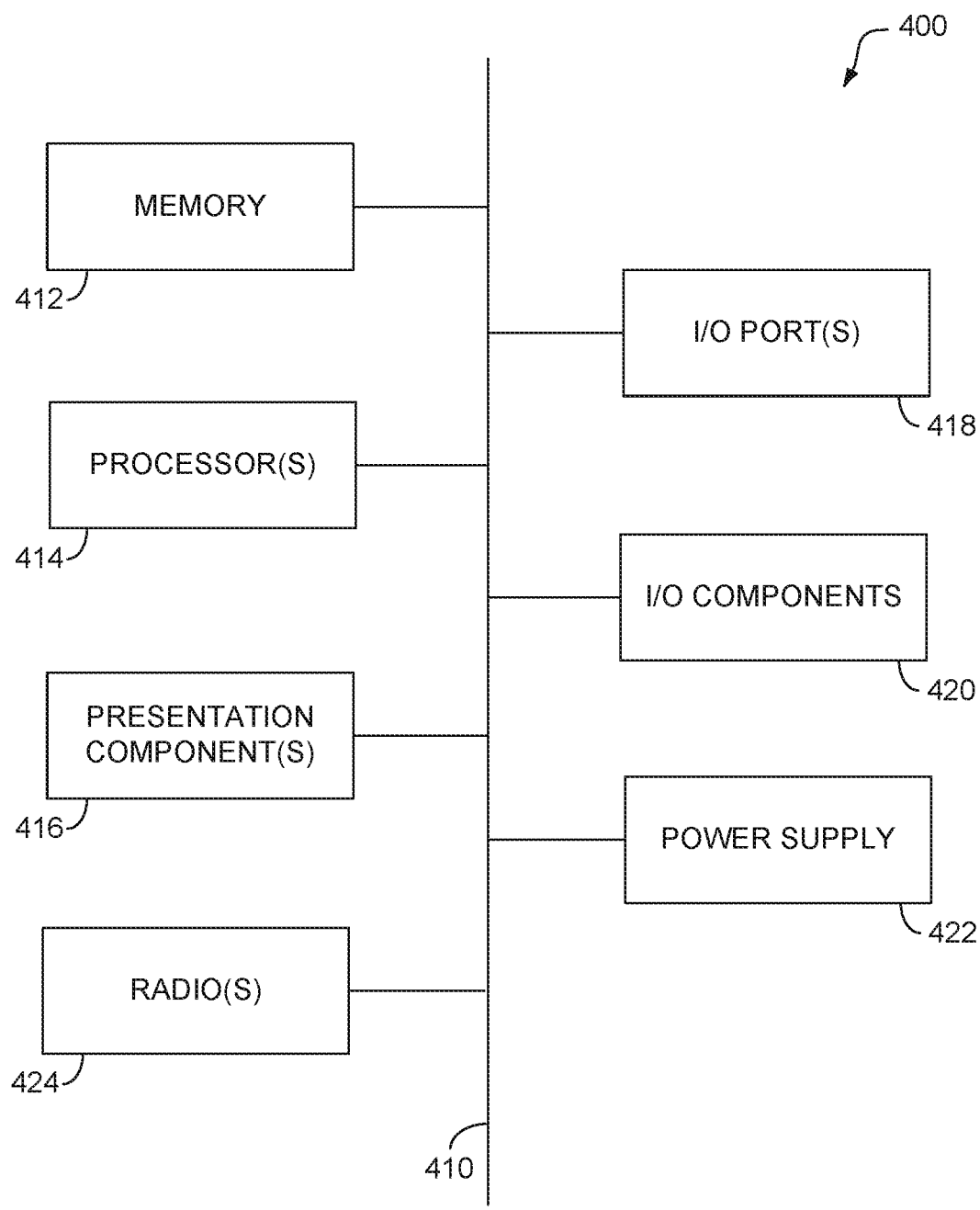
FIG. 4 is a block diagram of an exemplary computing environment suitable for use in implementing an aspect of the present disclosure.

Having described various implementations, an exemplary computing environment suitable for implementing aspects of the disclosure is now described. With reference to FIG. 4, an exemplary computing device is provided and referred to generally as computing device 400. The computing device 400 is but one example of a suitable computing environment and is not intended to suggest any limitation as to the scope of use or functionality of aspects of the disclosure. Neither should the computing device 400 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 4, computing device 400 includes a bus 410 that directly or indirectly couples the following devices: memory 412, one or more processors 414, one or more presentation components 416, one or more input/output (I/O) ports 418, one or more I/O components 420, and an illustrative power supply 422. Bus 410 represents what may be one or more busses (such as an address bus, data bus, or combination thereof). Although the various blocks of FIG. 4 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 4 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 4 and with reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 412 includes computer storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors 414 that read data from various entities such as memory 412 or I/O components 420. Presentation component(s) 416 presents data indications to a user or other device. Exemplary presentation components include a display device, speaker, printing component, vibrating component, and the like.

The I/O ports 418 allow computing device 400 to be logically coupled to other devices, including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 400. The computing device 400 may be equipped with depth cameras, such as stereoscopic camera systems, infrared camera systems, RGB camera systems, and combinations of these, for gesture detection and recognition. Additionally, the computing device 400 may be equipped with accelerometers or gyroscopes that enable detection of motion. The output of the accelerometers or gyroscopes may be provided to the display of the computing device 400 to render immersive augmented reality or virtual reality.

Some aspects of computing device 400 may include one or more radio(s) 424 (or similar wireless communication components). The radio 424 transmits and receives radio or wireless communications. The computing device 400 may be a wireless terminal adapted to receive communications and media over various wireless networks. Computing device 400 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Figure 5:
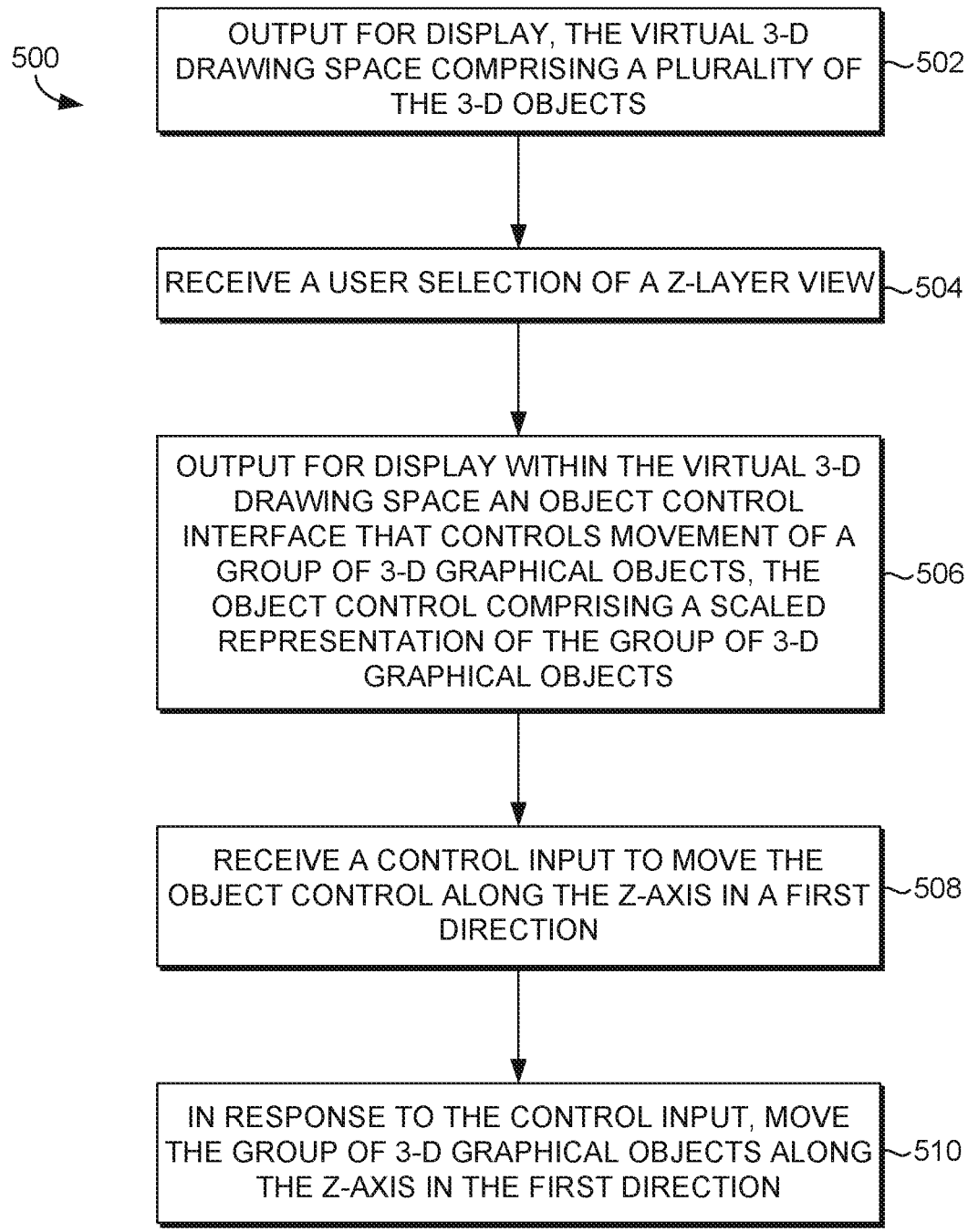
FIG. 5 shows a flow diagram for a method of moving objects, in accordance with aspects of the present disclosure.

Turning now to FIG. 5, a flow diagram of a method 500 for manipulation a 3-D graphical object is shown, in accordance with aspects of the present disclosure. Method 500 could be performed by a computing device, such as computing device 400. The computing device can take the form of a laptop computer, a personal computer with detached display, a tablet computer, a smartphone, a holographic display, a virtual reality headset, an augmented reality headset, or some combination of the above or similar devices.

At step 502, the virtual 3-D drawing space comprising a plurality of the 3-D objects is output for display. The virtual 3-D drawing space can be displayed in 3-D, using stereoscopic technology, or other techniques that provide a three-dimensional appearance to the display. The virtual 3-D drawing space can also be displayed in 2-D with various camera angles used to depict the 3-D space.

At step 504, the user activates a z-layers view. For example, the user can select a Z-layer interface control button to activate the view. The view can be created, in part, by changing a camera position on the virtual 3-D drawing space to be substantially perpendicular to the z-axis, thereby emphasizing a z-location of objects in the virtual 3-D drawing space. In an aspect, the camera position is moved to one side of the objects to be manipulated to emphasize the z-depth.

At step 506, an object control interface is output for display within the virtual 3-D drawing space. The object control can comprise a scaled representation of an object or group of objects associated with the control. The scale can be greater than 2:1, meaning the scaled representation is no more than half the size of the actual objects being represented. The scale can be much greater meaning the objects could be 10 times or more the size of the scaled representation. The object control can be located near a side of the interface where the camera is located.

At step 508, a control input is received to move the object control interface along the z-axis a first distance in a first direction. The control input can be selecting and dragging the object control. The movement can be constrained to only the z-direction. In other words, the x and y coordinates of the object control can remain constant during the control action.

At step 510, in response to the control input, the group of objects is moved along the z-axis in the first direction. The group of objects can be moved the same distance as the object control.

Figure 6:
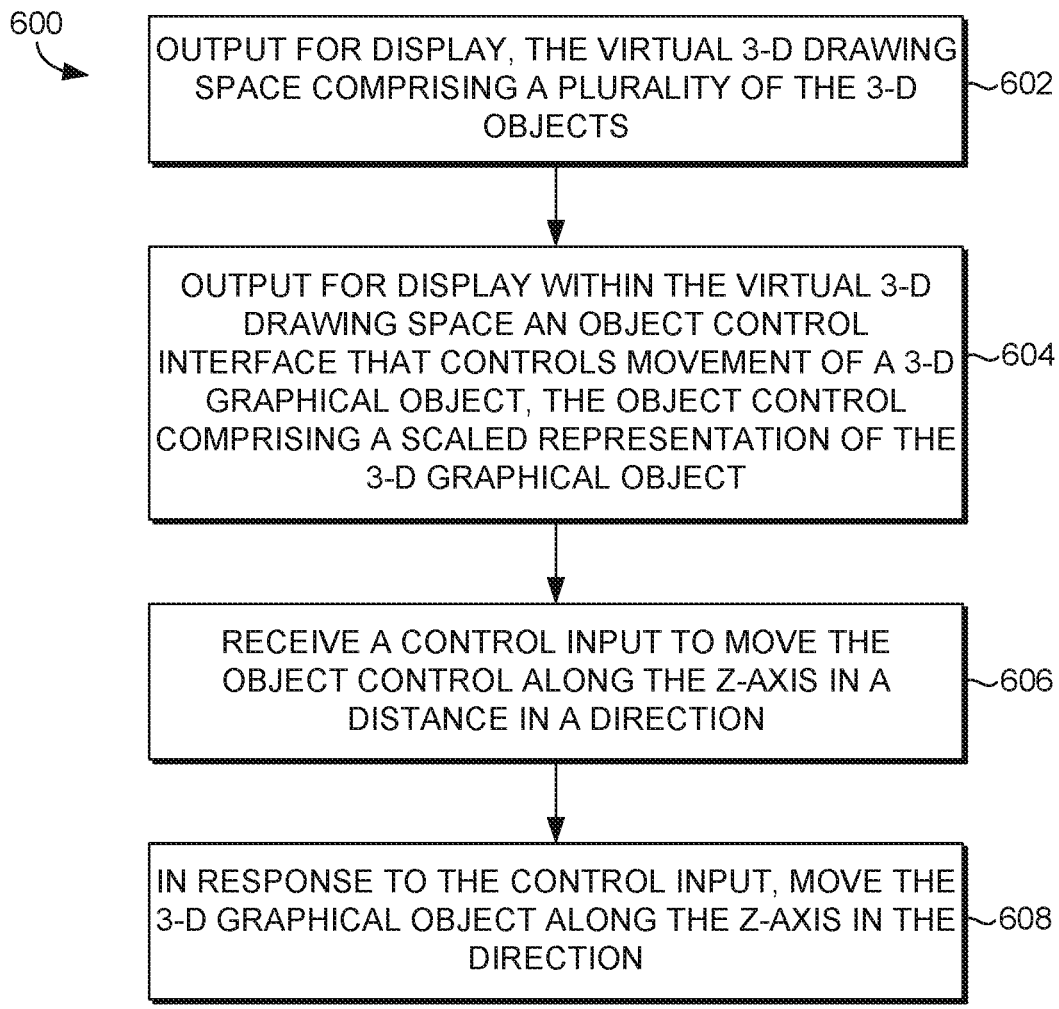
FIG. 6 shows a flow diagram for a method of moving objects, in accordance with aspects of the present disclosure.

Turning now to FIG. 6, a flow diagram of a method 600 for manipulation a 3-D graphical object is shown, in accordance with aspects of the present disclosure. Method 600 could be performed by a computing device, such as computing device 400. The computing device can take the form of a laptop computer, a personal computer with detached display, a tablet computer, a smartphone, a holographic display, a virtual reality headset, an augmented reality headset, or some combination of the above or similar devices.

At step 602, the virtual 3-D drawing space comprising a plurality of the 3-D objects is output for display. The virtual 3-D drawing space can be displayed in 3-D, using stereoscopic technology, or other techniques that provide a three-dimensional appearance to the display. The virtual 3-D drawing space can also be displayed in 2-D with various camera angles used to depict the 3-D space.

The user can activate a z-layers view. For example, the user can select a Z-layer interface control button to activate the view. The view can be created, in part, by changing a camera position on the virtual 3-D drawing space to be substantially perpendicular to the z-axis, thereby emphasizing a z-location of objects in the virtual 3-D drawing space. In an aspect, the camera position is moved to one side of the objects to be manipulated to emphasize the z-depth.

At step 604, an object control interface is output for display within the virtual 3-D drawing space. The object control can comprise a scaled representation of an object associated with the control. The scale can be greater than 2:1, meaning the scaled representation is no more than half the size of the actual object being represented. The scale can be much greater meaning the objects could be 10 times or more the size of the scaled representation. The object control can be located near a side of the interface where the camera is located.

At step 606, a control input is received to move the object control interface along the z-axis a first distance in a first direction. The control input can be selecting and dragging the object control. The movement can be constrained to only the z-direction. In other words, the x and y coordinates of the object control can remain constant during the control action.

At step 608, in response to the control input, the graphical object is moved along the z-axis in the first direction. The object can be moved the same distance as the object control.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computing system comprising a computer processor and a computer storage media, the computer readable media having computer executable instructions embodied thereon, which when executed by the computing system cause the computing system to perform a method of positioning a three-dimensional (3-D) graphical objects displayed in a virtual 3-D drawing space, the method comprising:
   outputting for display, the virtual 3-D drawing space comprising a plurality of 3-D graphical objects;
   outputting for display within the virtual 3-D drawing space an object control interface that controls movement of a group of 3-D graphical objects, wherein the object control comprises a scaled representation of the group of 3-D graphical objects;
   receiving a control input to move the scaled representation along a z-axis in a direction; and
   in response to the control input, moving the group of 3-D graphical objects along the z-axis in the direction.

2. The method of claim 1, wherein the object control is located below the group of 3-D graphical objects.

3. The method of claim 1, wherein the scaled representation is located to a side of the group of 3-D graphical objects, wherein the side is closest to a virtual camera showing the 3-D drawing space.

4. The method of claim 1, wherein the scaled representation is located at the same z-depth as the group of 3-D graphical objects.

5. The method of claim 1, wherein the method further comprises displaying a shadow of the group of objects underneath the group of objects.

6. The method of claim 5, wherein the method further comprises outputting for display a line running between the scaled representation and the shadow of the group of objects.

7. The method of claim 5, wherein the method further comprises:
   outputting for display within the virtual 3-D drawing space a second object control that controls movement of a single 3-D graphical object, the second object control comprising a scaled representation of the single 3-D graphical object;
   receiving a second control input to move the second object control along the z-axis in the direction; and
   in response to the second control input, moving the 3-D graphical object along the z-axis in the direction.

8. One or more computer-storage media comprising computer-executable instructions embodied thereon, that when executed by a computing device, perform a method of positioning three-dimensional (3-D) graphical objects displayed in a virtual 3-D drawing space, the method comprising:
   outputting for display, the virtual 3-D drawing space comprising a plurality of 3-D graphical objects;
   outputting for display within the virtual 3-D drawing space an object control interface that controls movement of a group of 3-D graphical objects;
   outputting for display within the virtual 3-D drawing space a line from the object control interface to a shadow underneath the group of objects
   receiving a control input to move the object control along a z-axis in a distance in a direction; and
   in response to the control input, moving the group of 3-D graphical objects along the z-axis in the direction.

9. The media of claim 8, wherein the object control is located below the group of 3-D graphical objects.

10. The media of claim 8, wherein the object control is located to a side of the group of 3-D graphical objects, wherein the side is closest to a virtual camera showing the 3-D drawing space.

11. The media of claim 8, wherein the object control is located at the same z-depth as the group of 3-D graphical objects.

12. The media of claim 8, wherein the object control comprises a scaled representation of the group of 3-D graphical objects.

13. The media of claim 8, wherein the group of 3-D graphical objects is moved the distance.

14. The media of claim 8, wherein the method further comprises:
   outputting for display within the virtual 3-D drawing space a second object control that controls movement of a single 3-D graphical object, the second object control comprising a scaled representation of the single 3-D graphical object;
   receiving a second control input to move the second object control along a z-axis in a second direction; and
   in response to the second control input, moving the 3-D graphical object along the z-axis in the second direction.

15. A method of positioning three-dimensional (3-D) graphical objects displayed in a virtual 3-D drawing space, the method comprising:
   outputting for display, the virtual 3-D drawing space comprising a plurality of 3-D graphical objects;
   outputting for display within the virtual 3-D drawing space an object control interface that controls movement of a 3-D graphical object, wherein the object control interface comprises a scaled representation of the 3-D graphical object;
   receiving a control input to move the scaled representation along the z-axis in a distance in a direction; and
   in response to the control input, moving the 3-D graphical object along the z-axis in the direction.

16. The method of claim 15, wherein the scaled representation is located below the 3-D graphical object.

17. The method of claim 15, wherein the scaled representation is located to a side of the 3-D graphical object, wherein the side is closest to a virtual camera showing the 3-D drawing space.

18. The method of claim 15, wherein the scaled representation is located at the same z-depth as the 3-D graphical object.

19. The method of claim 15, wherein the method further comprises displaying a line from the scaled representation to a shadow underneath the 3-D graphical object.

20. The method of claim 15, wherein the 3-D graphical object is moved the distance.

\* \* \* \* \*